No. 843,639. PATENTED FEB. 12, 1907.
C. W. STEVENS.
MACHINE FOR FORMING HATS.
APPLICATION FILED SEPT. 23, 1905.
4 SHEETS—SHEET 1.
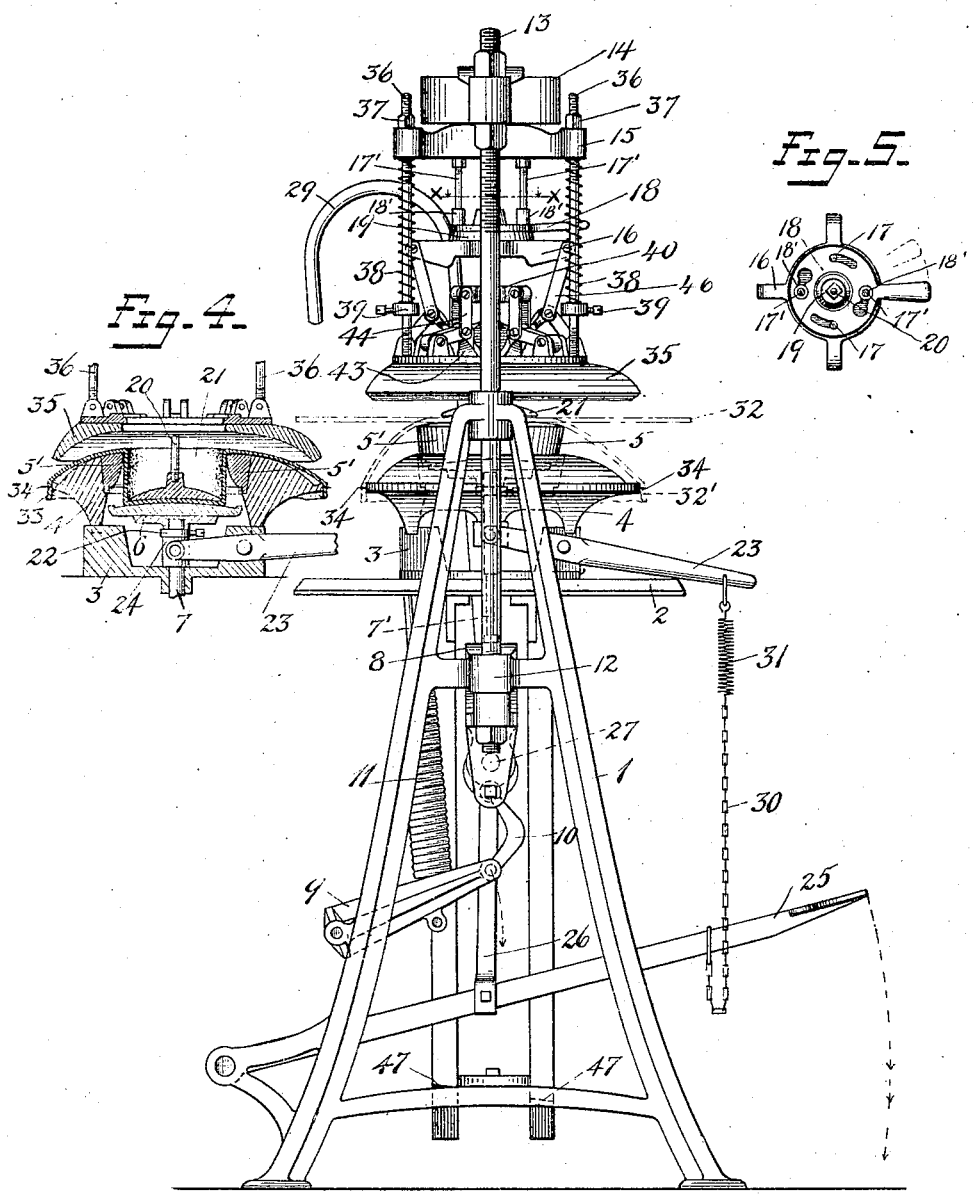
Witnesses
G. V. Rasmussen
Inventor
CHARLES W. STEVENS
By his Attorneys

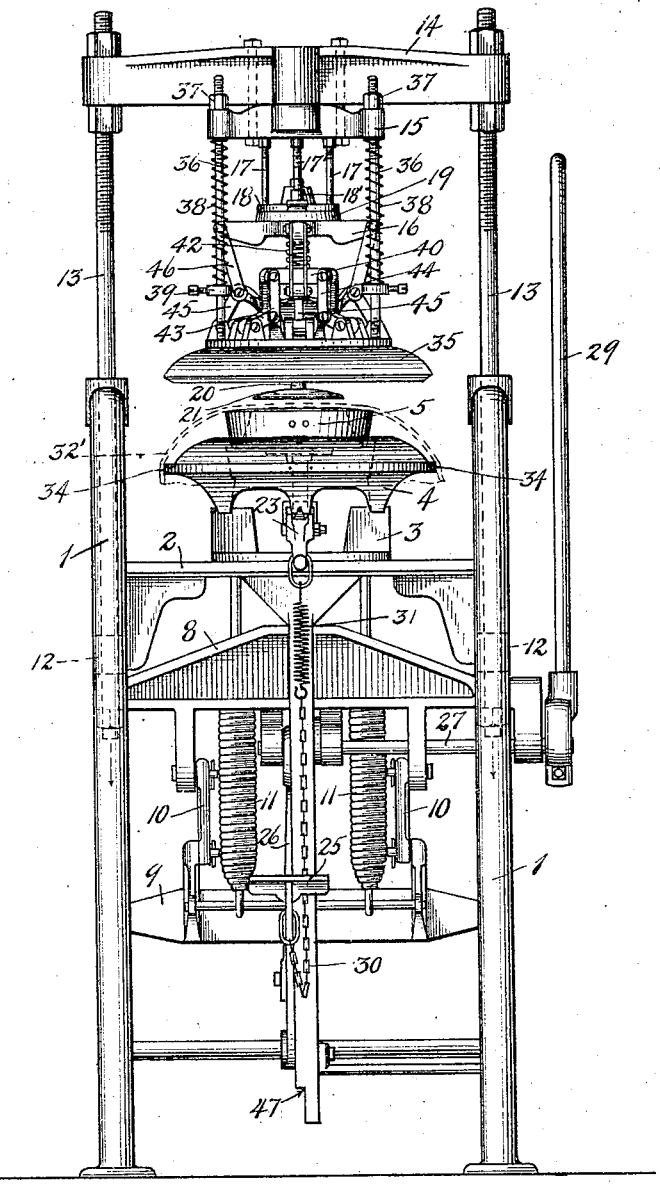

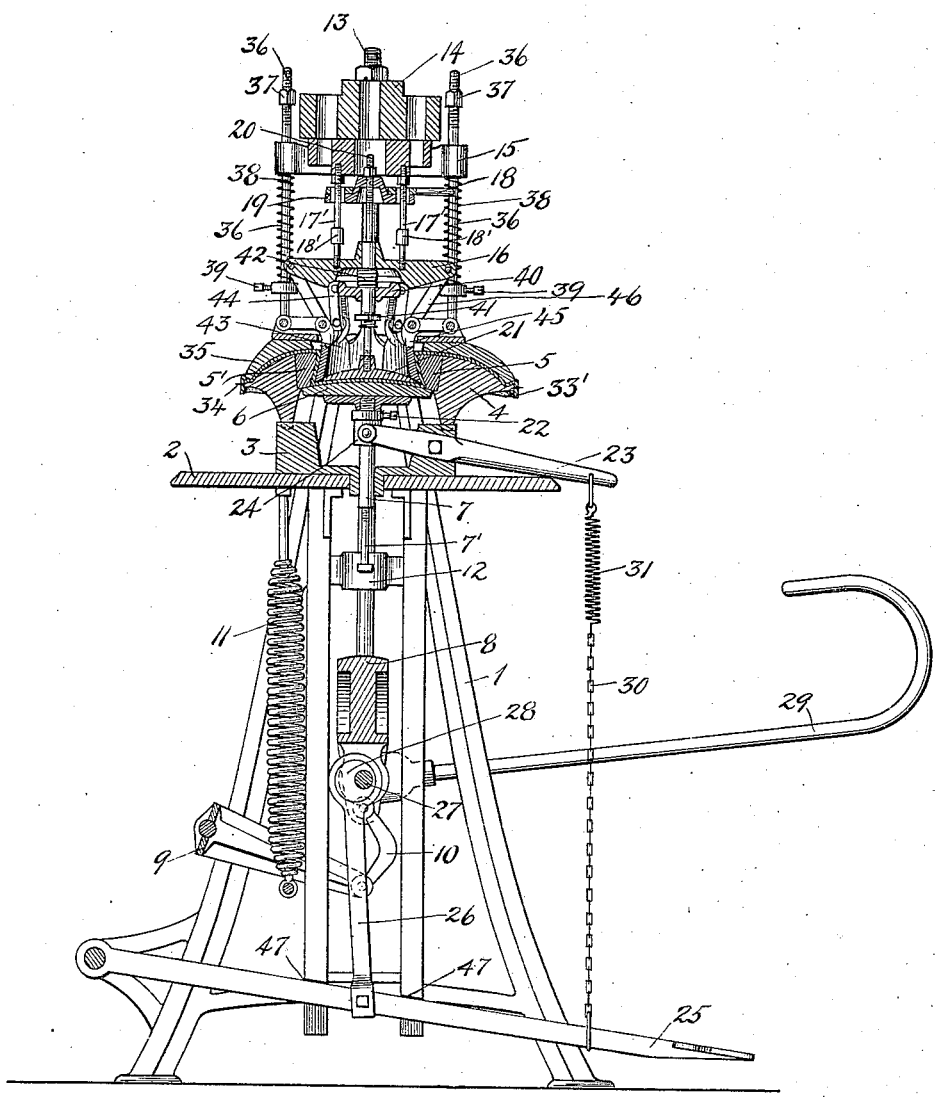

No. 843,639.
PATENTED FEB. 12, 1907.
C. W. STEVENS.
MACHINE FOR FORMING HATS.
APPLICATION FILED SEPT. 23, 1905.
4 SHEETS—SHEET 4.
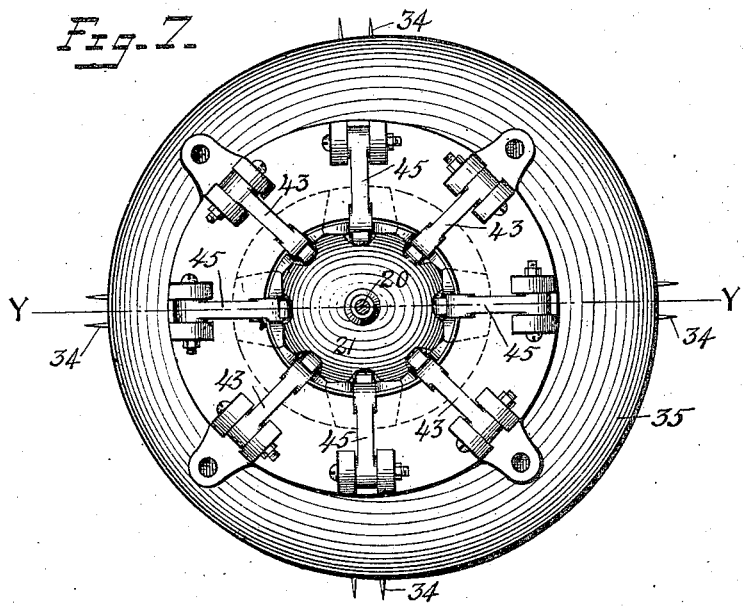
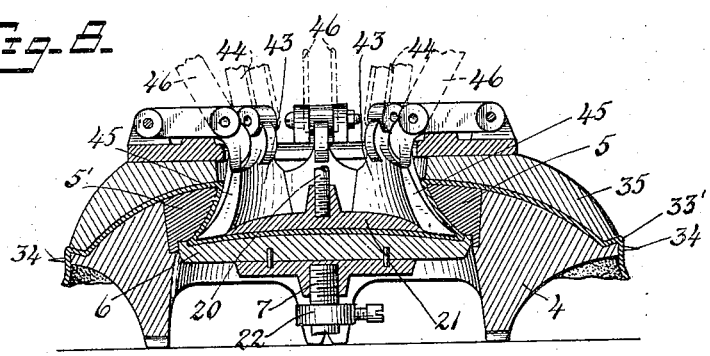
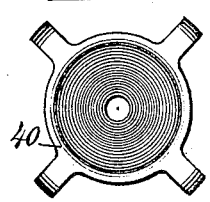
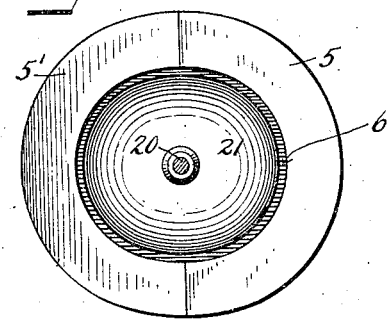
Witnesses
G. V. Rasmussen
Rob't S. Allyn
Inventor
CHARLES W. STEVENS
By his Attorneys

UNITED STATES PATENT OFFICE.

CHARLES W. STEVENS, OF EAST ORANGE, NEW JERSEY.

MACHINE FOR FORMING HATS.

No. 843,639.      Specification of Letters Patent.      Patented Feb. 12, 1907.

Application filed September 23, 1905. Serial No. 279,815.

*To all whom it may concern:*

Be it known that I, CHARLES W. STEVENS, a citizen of the United States, residing at East Orange, county of Essex, New Jersey, have invented certain new and useful Improvements in Machines for Forming Hats, of which the following is a full, clear, and exact description.

My invention relates to machines for forming hats from semiplastic material, such as dampened felt.

The object of the invention is to construct a machine which is adapted to employ dies of different shapes for forming hats of different styles. I have also sought to so arrange and construct the parts that the hat when formed shall be free from imperfections on the exterior or on any ordinarily visible portion of the interior. For ordinary use it is desirable that such a machine be operable in a very simple manner in order to avoid accidents due to the employment of unskilled labor and in order that the operation may be performed as expeditiously as possible. The sequence of operation is performed largely automatically when the machine is once started.

The principles of the invention are illustrated in the accompanying four sheets of drawings. Briefly, it may be said to comprise a frame supporting a die for shaping the upper surface of the brim, a press carrying a die for shaping the under surface of the brim, and also shapers for pressing the sides of the crown out against a ring which surrounds the exterior side walls of the crown. The tip for drawing out the crown is carried by the press, and the plate for shaping the top of the crown is actuated by the operating mechanism of the press. Suitable connections are made between the press and the shapers for permitting the operation of the same to be brought about at the proper time.

Figure 1 is a side view of a machine embodying the improvements of my invention in position ready for operation. Fig. 2 is a front view of the same. Fig. 3 is a vertical section and side elevation showing the parts in position with the hat completed and ready to be released. Fig. 4 is a fragmentary section of part of the dies in an intermediate step of the operation with the crown drawn out, but before shaping. Fig. 5 is a detail plan view of intermediate locking mechanism and a carrying-plate for part of the inner crown-shapers, the parts being in section on the plane of the line X X, Fig. 1. Fig. 6 is a detail plan, on a larger scale, of a carrying-plate for the other inner crown-shapers. Fig. 7 is a plan view, on the same scale as Fig. 6, of the dies removed from the machine. Fig. 8 is a vertical section of the same on the plane of the line Y Y, showing the hat completed in section. Fig. 9 is a detail plan view, on the same scale as Fig. 7, of the outer crown-dies and the inner tip-plate.

1 indicates the frame of the machine, of suitable construction and arrangement, for carrying the entire mechanism.

2 indicates the table upon which the work is supported and the operations performed.

3 is a bed-plate resting upon the table.

4 is a die supported on the bed-plate 3 and having an upper surface formed in accordance with any shape which it is desired the brim of the hat shall ultimately have.

5 and 5' are segments of an annular ring, the upper surface of which is shaped in accordance with a part of the proper curvature for the brim and having its inner wall formed according to the curve desired in the side wall of the crown. The diameter of the mouth or upper edge of the inner wall is less than the diameter of the bottom. In other words, the wall is undercut so as to produce a bell-crown effect of the hat.

6 is a plate shaped in accordance with the top of the crown desired and normally sustaining the ring-segments 5 5'.

7 is a rod having a cap which supports the plate 6. Preferably the rod is formed in two parts, the lower part 7' being screw-threaded into the upper part 7, so that the length of the rod may be adjusted.

8 is a beam which extends across the machine and is suitably guided in the frame.

9 is a pivoted yoke connected to the beam 8 by links 10 10.

11 11 are powerful springs, which are connected to the under side of the table 2 and to the yoke 9. They normally hold the yoke and beam in the upper position, the ends of the beam abutting against the stops 12 12 on the frame. Normally the end of the rod 7 rests on the beam 8.

13 13 are side bars carried by the beam 8 and connected at the top by the cross-beam 14.

15 is a frame bolted to the cross-beam 14.

16 is a carrying-plate supported from frame 15 by rods 17 17 and 17' 17'. The latter have projections 18' 18', adapted to pass through keyhole-shaped openings in the locking-plate 18.

19 is a plate located beneath the locking-plate 18 and having passages for the rods 17 17 and 17' 17'.

20 is a post secured to the plate 19 and having at its lower end the tip-plate 21.

22 is a collar clamped on the rod 7, but which may be adjusted vertically to the position desired.

23 is a lever pivoted in the bed 3.

24 is a sleeve mounted to slide on the rod 7 and loosely connected to the inner end of the lever 23. Normally the outer end of the lever rests on the edge of the table 2.

25 is a foot-lever pivoted in the frame 1 and connected by link 26 to the shaft 27, which is rotatably mounted in the beam 8.

28 is a cam secured to shaft 27, on which the link 26 is mounted.

29 is a hand-lever secured to shaft 27.

30 is a chain, and 31 is a spring connecting the foot-lever 25 with the lever 23.

The operation of the parts thus far described is as follows: The dies are heated in a suitable manner and the flat dampened or steamed blank 32 of proper size is placed across the outer crown, forming segments 5 5', in the position shown in dot-and-dash lines in Fig. 1, and then the edges curved or bent down, as shown dotted at 32', and caught on the prongs or pins 34, which project from the lower brim-die 4. The parts being then in the position shown in Fig. 1, the foot-lever 25 is depressed. When the beam 8 begins to descend, the rod 7 and lower crown-forming plate 6 are allowed to fall, and the dies 5 5' settle into the lower brim-forming die 4. At the same time the beam 8, bars 13 13, beam 14, frame 15, and plate 16, together with the plate 19, rod 20, and tip-plate 21, are drawn down, the plates 18 and 19 being locked beneath the projections 18' 18' on rods 17' 17'. The tip-plate as it descends draws down the blank into the form shown in Fig. 4. The continued downward movement of the lever 25 tightens the chain 30 and brings the lever 23 down again under the tension of the spring 31, forcing the lower crown-plate 6 yieldingly into the position shown in Fig. 4.

35 is a die for shaping the under side of the brim in conjunction with the die 4. It is supported by rods 36, four in number, which pass freely through the frame 15 and have check-nuts 37 screw-threaded on their upper ends.

38 is a spring, one of which is mounted on each of the rods 36 and abuts at its upper end against the frame 15 and at its lower end against an adjustable collar 39, carried by the rods 36.

After the parts have been brought into the position shown in Fig. 4 the locking-plate 18 is rotated to release the plate 19, and thus permit the beam 14 and attached parts to descend further until the brim-forming die 35 is brought into action, as shown in Fig. 3.

40 is a plate normally supported by the adjustable nut 41 on the tip-rod 20.

42 is a spring which is interposed between the plates 16 and 40.

43 indicates an inner crown-shaping member, of which there are four, pivoted to the brim-die 35, which may best be seen in Fig. 7. These are connected by links 44 to the carrying-plate 40.

45 indicates another inner crown-shaping member, of which there is a series of four, pivoted to the brim-die 35 alternately with the shapers 43. (See Figs. 7 and 8.) The members of the second series are connected to the carrying-plate 16 by links 46.

The operation of the inner crown-shaping members after the crown has been stretched, as shown in Fig. 4, is as follows: The continued depression of the lever 25 after the locking-plate 18 has been released forces the carrying-plate 16 downward and compresses the spring 42, which forces the carrying-plate 40 downward and throws the shapers 43 out against the inner wall of the crown. The continued depression of the lever 25 brings the shapers 45 into position within the crown and forces them between the shapers 43 with a wedging action. At this time the lever 25 is moved slightly to the right and caught beneath the shoulders 47 47 of the frame. The pressure of the crown-shapers is increased to give the crown its final set by throwing the lever 29 into the position shown in Fig. 3, when the cam or eccentric 28 turns in the strap of the link 26 and brings the beam 8 and upper dies down hard with a toggle-like action. When the pressure has remained on long enough to insure the proper condition of the hat, the hand-lever 29 is then thrown back and the foot-lever 25 released from the locking-shoulders 47 47. The springs 11 then lift up the beam 8 of the press. The upward movement of the beam 14 and frame 15 lifts the carrying-plate 16 and causes the withdrawal of the shapers 45, the release of the spring 42, and the withdrawal of the shapers 43 by contact of the nut 41. The brim-die 35 is then lifted and, lastly, the tip-plate 21. Following the withdrawal of the tip-plate the beam 8 strikes the lower end of the rod 7 and lifts out the dies 5 and 5' with the completed form, with the parts of the mechanism as shown in Fig. 1. The front crown-die 5 is then taken out by a suitable tool, leaving the hat-form free for removal. After the hat is removed the die 5 is replaced preparatory to the formation of another.

The shape of the surfaces of the dies which come in contact with the blanks may be varied, so as to press a hat of any shape desired. Any amount of bell may be given to the crown by a proper angle between the pressing-surfaces and shanks of the inner crown-shapers, the outer crown ring or die being of course of a shape to correspond. The same machine is adapted to form hats of varying sizes by simply adjusting the relative initial positions of the parts. For instance, the effective length of the rods 36 may be adjusted by the nuts 37. The tip-plate may be adjusted up or down relative to the plate 19. The time of throw of the shapers 43 may be varied by adjusting the nut 41. The position of the parts for obtaining the height of crown desired may be varied by adjusting the collar 22 on the rod 7 and adjusting the lower end of the rod 7'. The pressure of the springs 38 may be adjusted by collar 39. The beam 14 may be adjusted up and down on the bars 13 to vary the height of the press. The pressure of the lever 23 may be adjusted by varying the length of the chain 30.

The height of the outer crown-ring when in its initial position is such that when the curved blank 32' is caught over the points 34 sufficient material is provided for the formation of the crown without materially affecting its thickness. So, also, the movement of the tip-plate 21 into the position shown in Fig. 4 draws down enough material to form the "bell" of the crown in the next operation without affecting its thickness.

What I claim is—

1. A hat-forming machine, including brim-shaping dies, a separate outer crown-shaping die, two series of movable inner crown-shaping members supported above said dies, and means for bringing one series into operation in advance of the other.

2. In a hat-forming machine, brim-shaping dies, a separate sectional outer crown-shaping die, inner crown-shaping members pivotally mounted above said dies, and a foot-lever with connections for bringing said members into operation.

3. In a hat-forming machine, two brim-shaping dies, an outer crown-shaping die, a tip-plate, controllable means for bringing said tip-plate into operation to draw the crown, manually-controllable means for subsequently bringing the brim-shaping dies into coöperation, and means for adjusting the extent of movement of said tip-plate.

4. In a hat-forming machine, a sectional outer crown-shaping die, a plurality of movable inner crown-shaping members supported above said die, a foot-lever and connections therewith for bringing said inner crown-shaping members down into operation and retracting the same.

5. In a hat-forming machine, an outer crown-shaping die, a series of movable inner crown-shaping members, a tip-plate movable vertically independently thereof, and a lever-operable press for bringing said tip-plate into operation to draw the crown before said shaping members are operated.

6. In a hat-forming machine, a frame having a table, a brim-shaping die supported thereon, a press including a brim-shaping die, a tip-plate, means for bringing the tip-plate into operation to draw the crown of the hat, and means for releasing the tip-plate and subsequently bringing the press-die into position.

7. In a machine for forming hats, a sectional outer crown-shaping die, two series of inner crown-shaping members, means for bringing one series of said members into operation in advance of the other, and means for producing a supplemental wedging action after the operation of the second series.

8. In a hat-forming machine, a stationary brim-shaping die, a press, means for operating said press, a second brim-shaping die carried by said press, an outer crown-shaping die, a forming-plate for the top of the crown normally supporting said outer crown-shaping die above said stationary brim-shaping die, a tip-plate carried by said press, and means for automatically depressing the top crown-plate and outer crown-shaping dies in advance of the action of said tip-plate.

9. In a hat-forming machine, a frame, a stationary brim-shaping die, a vertically-movable outer crown-shaping die, a top crown-plate, means for rigidly holding it in its normal position, means for releasing it, and means for subsequently yieldingly pressing it into operation.

10. In a hat-forming machine, a stationary brim-shaping die, a movable brim-shaping die, an outer crown-shaping die, a tip-plate, inner crown-shaping members, means for bringing said tip-plate into operation to draw the crown of the hat, means for subsequently bringing said movable brim-shaping die into operative position, and means for subsequently bringing said inner crown-shaping members into operation.

11. In a hat-forming machine, an outer crown-shaping die, a plurality of inner crown-shaping members, means for bringing them into operation, locking means therefor, and means for subsequently increasing the pressure of said inner crown-shaping members.

12. In a hat-forming machine, a stationary brim-shaping die, a segmental outer crown-shaping die adapted to be seated in said brim-shaping die, a plurality of inner crown-shaping members and means for automatically lifting said outer crown-shaping die out of said brim-shaping die when the hat is completed.

13. In a hat-forming machine, a die for shaping the upper brim-surface, means for holding the edge of the blank, an outer crown-forming ring, means for normally holding it above the brim-die, and means for depressing it simultaneously with the drawing out of the crown.

14. In a hat-machine, dies for shaping the brim, an outer bell-crown die, an inner tip-plate, and means for moving said plate a distance sufficient to draw out enough of the blank to subsequently form the "bell" without material thinning of the stock.

15. In a hat-machine, a plurality of crown-forming members arranged in two series, one series being normally above and free from the other, and means for bringing the two series down into a common plane.

16. In a hat-machine, a vertically-movable support, two series of crown-shaping members pivotally carried thereby, two plates vertically movable with relation to each other, and links connecting said plates to said shaping members.

17. In a hat-machine, a vertically-movable support, two series of crown-shaping members pivotally carried thereby, two plates vertically movable with relation to each other, a spring operating between said plates, and links connecting said plates to said shaping members.

18. In a hat-machine, a vertically-movable support, two series of crown-shaping members pivotally carried thereby, two plates vertically movable with relation to each other, links connecting said plates to said shaping members, and means for bringing the series connected to one plate into yielding operation in advance of the other series.

19. In a hat-machine, an upper brim-forming die, two series of crown-forming members mounted above said die, and means for bringing the brim-forming die, one series of crown-forming members and then the other series of crown-forming members down into operation successively.

20. In a hat-machine, a brim-forming die, two series of crown-forming members, a tip-plate, and means for bringing the tip-plate, the brim-forming die, one series of crown-forming members and then the other series of crown-forming members into operation successively.

21. In a hat-machine, a lower brim-forming die, an outer crown-forming die, a plate for normally sustaining the crown-forming die, an upper brim-forming die, a tip-plate, and means for simultaneously lowering the sustaining-plate and the tip-plate in advance of the upper brim-forming die.

22. In a hat-machine, a lower brim-forming die, an outer crown-forming die, a plate for normally sustaining the crown-forming die, an upper brim-forming die, a tip-plate, means for simultaneously lowering the sustaining-plate and the tip-plate in advance of the upper brim-forming die, and means for raising the tip-plate a short distance while the upper brim-forming die is in operation.

23. In a hat-machine, a brim-forming die, two series of crown-forming members, a movable press carrying said die and members, means for bringing said die and members successively into operation, and means for giving a final supplemental action to said crown-forming members.

24. In a hat-machine, a press, a brim-forming die yieldingly supported thereby, two series of crown-forming members, and means carried by said press for bringing one of said series of members into operation yieldingly in advance of the other series.

25. In a hat-machine, a press, a brim-forming die yieldingly supported thereby, a tip-plate, two series of crown-forming members, and means carried by said press for bringing said tip-plate into operation and then bringing one of said series of members into operation yieldingly in advance of the other series.

26. A hat-machine, including two series of crown-forming members, a support therefor, two operating-plates, means of connection between said plates and said members, and a spring between said plates.

27. A hat-machine, including a series of crown-forming members, an operating-plate connected to said members, a press, and yielding means of connection between said press and said plate.

28. A hat-machine, including a press, crown-shaping members operable thereby, a lever for operating said press, a lower crown-plate, and a yielding connection between said plate and said press-lever.

29. In a hat-machine, a segmental outer crown-forming die and eight inner crown-forming members arranged in two series, the members of one series being substantially wider at the bottom than at the top and alternating with the members of the other series, the members of which are substantially wider at the top than at the bottom, and means for bringing the members of the two series into operation with the members of one series forcibly wedged in between the members of the other series.

30. In a hat-machine, an outer crown-forming die having an entrance-opening smaller at the top than at the bottom, two series of inner crown-forming members pivotally mounted above said outer crown-forming die, and means for moving said inner crown-forming members down and wedging them out inside the outer crown-forming die.

31. In a shaping-machine, two annular members, one of said members being divided into two series of independently-movable parts, two vertically-movable plates, one of said series of parts being connected to one plate and the other series of parts connected to the other plate, and means for moving said plates relative to each other for bringing the two series of parts into operation successively.

32. In a shaping-machine, a tip-plate, an annular shaping member divided into two series of relatively movable parts, one series being normally elevated above the other series, and means for successively bringing the tip-plate and the two series of parts into operation upon a blank.

33. In a shaping-machine, a lower annular die member having an upper shaping-surface, a segmental die member supported therein and having inner and upper shaping-surfaces, an upper die member having a lower shaping-surface, a plurality of relatively movable inner shaping members, and means for bringing said upper die member and said inner shaping members into operation successively.

34. In a shaping-machine, a lower die member having an upper shaping-surface, a segmental die member having inner and upper shaping-surfaces, a tip-plate, an upper die member having a lower shaping-surface, a plurality of inner shaping members, and means for successively bringing into operation the tip-plate, the upper die and the inner shaping members.

35. In a shaping-machine, a lower die having an upper shaping-surface, a segmental die having an upper shaping-surface and an inner shaping-surface, an upper die having a lower shaping-surface, a plurality of inner shaping members, a vertically-movable press supporting said upper die and said inner shaping members, and means for operating said members to bring said upper die into operation in advance of said inner shaping members.

36. In a shaping-machine, a lower segmental die having an opening with an undercut shaping-surface and having an upper shaping-surface, a vertically-movable upper die having an opening, a vertical post, two plates movable thereon relative to each other, and a plurality of inner shaping members connected to said plates.

37. In a shaping-machine, a segmental die having an inner shaping-surface, a post, a tip-plate carried by the end thereof, and a plurality of inner shaping members vertically movable relative to said post and said tip-plate.

38. In a shaping-machine, a die having an undercut inner shaping-surface, a post, a tip-plate carried thereby, an inner shaping-die divided into two series of relatively movable parts, one of said series being normally above the other, and means for bringing said tip-plate into operation in advance of both of said series of parts.

39. In a shaping-machine, a die having an undercut inner shaping-surface, a relatively movable bottom plate having an upper shaping-surface, and a plurality of relatively movable inner shaping members.

40. In a shaping-machine, a die having an undercut inner shaping-surface, a relatively movable bottom plate having an upper shaping-surface, a plurality of relatively movable inner shaping members, a tip-plate, and means for bringing said tip-plate into operation in advance of said inner shaping members.

41. In a shaping-machine, a lower die having an upper shaping-surface, a relatively movable annular die adapted to be seated therein and having inner and upper shaping-surfaces, a plurality of inner shaping members, and means for lowering said annular die in advance of the operation of said inner shaping members.

42. In a shaping-machine, a lower die having an upper shaping-surface, a relatively movable annular die adapted to be seated therein and having inner and upper shaping-surfaces, a plurality of inner shaping members, means for lowering said annular die in advance of the operation of said inner shaping members, and means for retracting said inner shaping-dies in advance of the upward movement of said annular die.

43. In a shaping-machine, a die having an undercut shaping-surface, two vertically-movable plates, a plurality of inner shaping members arranged in two series, the members of one series being connected to one plate and being substantially wider at the bottom than at the top, and the members of the other series being connected to the other plate and being substantially wider at the top than at the bottom.

44. A shaping-machine including a plurality of relatively movable shaping members, a lever-operable press for bringing all of said members together into annular arrangement and lever-operable means for giving a supplemental wedging action to said members.

45. A shaping-machine including a plurality of relatively movable shaping members forming a complete annular die, and a tip-plate adjustable and movable independently of all of said members.

CHARLES W. STEVENS.

Witnesses:
L. VREELAND,
ROBT. S. ALLYN.